(12) United States Patent
Richter et al.

(10) Patent No.: US 7,735,330 B2
(45) Date of Patent: Jun. 15, 2010

(54) AIR CONDITIONING UNIT

(75) Inventors: Gerald Richter, Aachen (DE); Thomas Ehlers, Krefeld (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 934 days.

(21) Appl. No.: 11/359,729

(22) Filed: Feb. 22, 2006

(65) Prior Publication Data

US 2006/0196205 A1 Sep. 7, 2006

(30) Foreign Application Priority Data

Feb. 22, 2005 (DE) .................. 10 2005 009 325

(51) Int. Cl.
*B60H 1/32* (2006.01)
(52) U.S. Cl. .......................... 62/239; 62/419
(58) Field of Classification Search .............. 62/239, 62/244, 404, 410–412, 89, 419
See application file for complete search history.

(56) References Cited

U.S. PATENT DOCUMENTS

| 2,784,568 | A | * | 3/1957 | Schjolin | 62/323.1 |
|---|---|---|---|---|---|
| 4,043,143 | A | * | 8/1977 | Fluder et al. | 62/243 |
| 4,098,093 | A | * | 7/1978 | Czyl | 62/243 |
| 4,201,064 | A | * | 5/1980 | Krug et al. | 62/239 |
| 4,592,207 | A | * | 6/1986 | Rummel | 62/244 |
| 4,607,497 | A | * | 8/1986 | Ferdows et al. | 62/179 |
| 4,622,831 | A | * | 11/1986 | Grupa | 62/244 |
| 4,641,502 | A | * | 2/1987 | Aldrich et al. | 62/244 |
| 4,727,728 | A | * | 3/1988 | Brown | 62/244 |
| 4,905,478 | A | * | 3/1990 | Matsuda et al. | 62/244 |
| 4,926,655 | A | * | 5/1990 | King | 62/244 |
| 4,967,569 | A | * | 11/1990 | Machen et al. | 62/240 |
| 4,982,583 | A | * | 1/1991 | Matsuda et al. | 62/244 |
| 4,996,850 | A | * | 3/1991 | Boxum et al. | 62/409 |
| 5,001,905 | A | * | 3/1991 | Miyazaki | 62/244 |
| 5,005,372 | A | * | 4/1991 | King | 62/244 |
| 5,184,474 | A | * | 2/1993 | Ferdows | 62/244 |
| 5,220,808 | A | * | 6/1993 | Mayer | 62/244 |
| 5,307,645 | A | * | 5/1994 | Pannell | 62/244 |
| 5,579,649 | A | * | 12/1996 | Kim | 62/239 |
| 5,605,055 | A | * | 2/1997 | Salgado | 62/244 |
| 5,632,330 | A | * | 5/1997 | Drucker et al. | 165/151 |
| 5,791,156 | A | * | 8/1998 | Strautman et al. | 62/244 |
| 6,161,609 | A | * | 12/2000 | Ahn | 165/41 |

(Continued)

FOREIGN PATENT DOCUMENTS

DE 100 42 683 A1 3/2002

*Primary Examiner*—Melvin Jones
(74) *Attorney, Agent, or Firm*—Brinks Hofer Gilson & Lione

(57) ABSTRACT

The invention relates to a heating, ventilation and air conditioning (HVAC) system, particularly a flat, modular air conditioning unit for a motor vehicle, including an essentially box-shaped casing with a length y, a height z and a width x, and several air guiding and air distribution devices placed between an air inlet and an air outlet. Air conditioning devices, including a heat exchanger and a fan, are also provided. According to the invention the air conditioning devices are linearly arranged one after another along the length y of the casing. The heat exchanger is inclined relative to the length y of the casing by an angle a' and relative to the width x of the casing by an angle b' such that y>x>z.

13 Claims, 12 Drawing Sheets

U.S. PATENT DOCUMENTS

| | | | |
|---|---|---|---|
| 6,282,912 B1* | 9/2001 | Mannerheim | 62/244 |
| 6,494,052 B1* | 12/2002 | Lee | 62/244 |
| 6,708,513 B2* | 3/2004 | Koehler et al. | 62/244 |
| 6,751,975 B1* | 6/2004 | Reimann | 62/279 |
| 6,763,670 B1* | 7/2004 | Bushnell et al. | 62/200 |
| 6,796,132 B1* | 9/2004 | Hille et al. | 62/89 |
| 2001/0025707 A1* | 10/2001 | Onda et al. | 165/202 |
| 2001/0035019 A1* | 11/2001 | Arold | 62/244 |
| 2002/0108385 A1* | 8/2002 | Rivalta et al. | 62/244 |
| 2003/0116303 A1* | 6/2003 | Kang et al. | 165/42 |
| 2003/0192334 A1* | 10/2003 | Kawauchi et al. | 62/244 |
| 2003/0213579 A1* | 11/2003 | Nakagawa et al. | 165/42 |
| 2003/0217833 A1* | 11/2003 | Alber et al. | 165/42 |
| 2004/0016537 A1* | 1/2004 | Nakamura et al. | 165/204 |
| 2004/0045309 A1* | 3/2004 | Nagaya et al. | 62/244 |
| 2004/0069484 A1* | 4/2004 | Tokunaga et al. | 165/204 |
| 2004/0089006 A1* | 5/2004 | Kamiya et al. | 62/244 |
| 2004/0093884 A1* | 5/2004 | Seki et al. | 62/244 |
| 2004/0093885 A1* | 5/2004 | Ito et al. | 62/244 |
| 2004/0112075 A1* | 6/2004 | Kachi | 62/244 |
| 2004/0206100 A1* | 10/2004 | Tokunaga et al. | 62/179 |
| 2004/0221595 A1* | 11/2004 | Hille et al. | 62/244 |
| 2004/0221596 A1* | 11/2004 | Hille et al. | 62/244 |
| 2005/0217295 A1* | 10/2005 | Alberternst et al. | 62/239 |

* cited by examiner

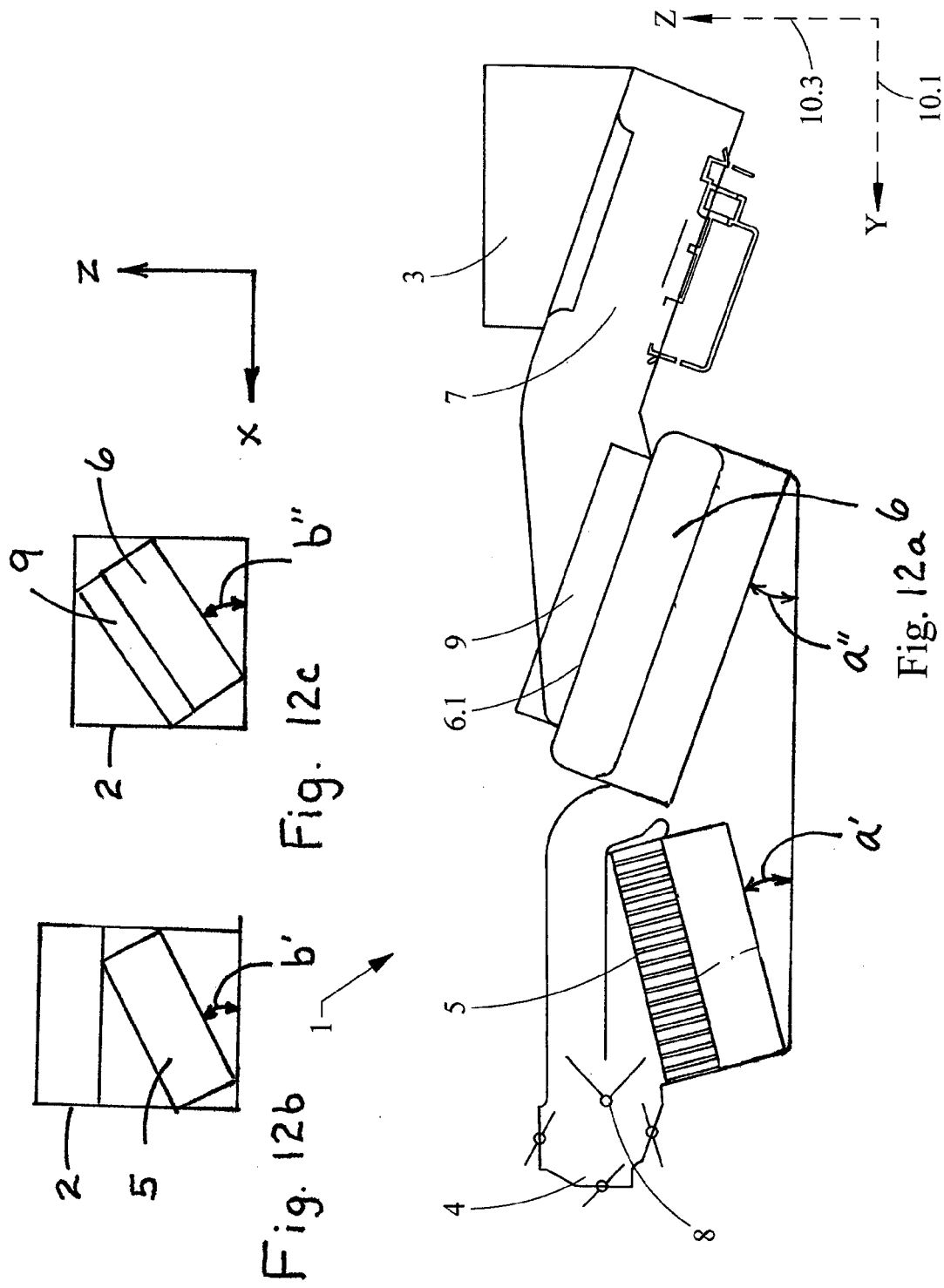

AIR CONDITIONING UNIT

BACKGROUND OF THE INVENTION

1. Field of the Invention

The invention relates to a heating, ventilation, and air conditioning (HVAC) system for a motor vehicle. More particularly it relates to a flat, modular HVAC system having minimal packaging requirements.

2. Prior Technology

During the design of a motor vehicle, the shape and dimensions of the vehicle body are defined. This determines the maximum amount of space available for each vehicle system and component to be installed. The result of this process, that often takes place parallel to the design and aerodynamic development of the vehicle, is often referred to as establishing the packaging requirements of components. The packaging requirements of HVAC systems, particularly air conditioning units, requires intensive development work because such equipment requires significant space.

Such development work is focused first on the geometry of the HVAC system (i.e. to make it smaller), and second on the position of the HVAC system within in the vehicle such that it does not interfere with the vehicle's passengers. As a result, the HVAC system may be placed, for example, in the instrument panel and/or front partition panel to maximize the foot space available to the driver and front seat passenger. Nevertheless, current HVAC systems still require excessive mounting space in a longitudinal direction of the vehicle, despite the optimized packaging and geometry.

In DE 100 42 683 A1 a known air conditioning unit is disclosed. The air conditioning unit has a first flat casing part extending in a first main extension plane, whereby the first flat casing part includes a fan and at least one directly downstream first flow channel section with an evaporator body arranged within. Further, a second flat casing part extending essentially in a second main extension plane is provided that includes a second flow channel section arranged downstream of the first flow channel section, with a heating body arranged in it as well as at least one downstream air outlet openings. This invention is characterized by the fact that the second flat casing part is connected to the first flat casing part forming an angle greater than 0° and smaller that 180° between both main extension planes.

Another air conditioning unit is described in U.S. Pat. No. 6,708,513. Here the air conditioning unit comprises a compressor with a compressor drive, an interior heat exchanger, an expansion element, an external heat exchanger and, if applicable, an internal heat exchanger. This unit is characterized by the fact that it is established as independent flat module, which is intended, in a cooling mode, to cool and, in a heat pump mode, to heat. The compressor is a high-power small-volume carbon dioxide compressor. The compressor drive is integrated into the module, with a power supply compatible with a single power source.

BRIEF SUMMARY OF THE INVENTION

In satisfying the above need, as well as overcoming the enumerated drawbacks and other limitations of the related art, the present invention provides a HVAC system, particularly a modular single or multiple-zone air conditioning unit, having a flat shape for motor vehicles which is highly compact and requires minimal mounting space. This permits a wide range of installation positions depending on the geometry of a particular vehicle.

The HVAC system of the present invention comprises an essentially box-shaped casing having a longitudinal axis y, a height axis z and a transverse axis x. Air conditioning devices and several air guiding and air distribution mechanisms are placed between an air inlet and an air outlet of the casing. At least one heat exchanger and a fan are provided as air conditioning devices. The air conditioning devices between the air inlet and the air outlet are linearly arranged along the longitudinal axis y of the casing. The heat exchanger is inclined relative to the longitudinal axis y of the casing by an angle a' and relative to the transverse axis x of the casing by an angle b', with the term y>x>z applying. While the casings of the HVAC systems in the state-of-the-art are very large, an arrangement of the casing according to the present invention enables a significant reduction in the mounting space required for the HVAC system.

This is accomplished by inclining the heat exchanger relative to the longitudinal axis y and/or the transverse axis x and/or the height axis z of the casing of the HVAC system such that the height of the casing is always smaller than the width of the casing. The casing of the HVAC system is further configured such that its inner contour or outer contour have a shape that permits the free positioning of the heat exchanger. In addition to the shape of the casing, fixing means such as stops, recesses or position marks can be used to precisely position the heat exchanger within the space enclosed by the casing.

In addition, not only heating heat exchangers but also evaporators for cooling or electrical heaters may be provided as heat exchangers.

Thus, all heat exchangers intended for coupling to external systems as well as internal heat exchangers, may be included. If both the evaporator and the heating heat exchanger are located together in an HVAC system, the HVAC system fulfils the functions of an air conditioning unit. Apart from heat exchangers, air filters may also be included in the HVAC system.

For the purposes of this invention a' the angle of inclination of the heating heat exchanger is defined as a', and the angle of inclination of the evaporator is defined as a". If the evaporator and the heating heat exchanger are additionally inclined on a second axis, the angle of inclination of the heating heat exchanger is defined as b', and the angle of inclination of the evaporator is defined as b".

In one embodiment of the invention the heat exchanger is a heating heat exchanger inclined in the casing of the HVAC system at an angle a', $0°<a'\leq90°$, relative to the x,z-plane so that the term y>x>z applies. As a result, as seen in the longitudinal section of the casing, the heat exchanger can take any orientation from horizontal up to vertical.

If an evaporator is provided as an additional air conditioning device, the evaporator, in the same way as the heating heat exchanger, is also inclined relative to the longitudinal axis y of the casing by an angle a", and relative to the transverse axis x of the casing by an angle b" so that the term y>x>z applies. In a preferred embodiment of the invention, the evaporator is inclined such that the angle a", $0°<a''\leq90°$, to the x,z-plane so that the term y>x>z applies.

To minimize the space required for the HVAC system, it is particularly advantageous if both the passage area of the heating heat exchanger and the passage area of the evaporator each produce an angle between, 45° and 90°, to the x,y-plane. In another embodiment of the invention the angle of inclination of the heating heat exchanger and the angle of inclination of the evaporator are equivalent to each other. The angle of inclination can be, for example, 60° whereby the evaporator and the heating heat exchanger are inclined toward the same direction.

Since the height of the casing of the HVAC system is reduced by the angle of the evaporator and the heating heat exchanger, the HVAC system may be placed at the following locations:

between the module carrier or cross rail of the cockpit and the surface of the instrument panel;

at the front partition panel between the passenger compartment and the engine bay;

above or below the floor pan of the passenger compartment; and in the roof liner.

As would be apparent to any person skilled in the art, the mounting position of the HVAC system aligns with the above mentioned mounting locations. For example, if the roof liner is the chosen mounting location of the HVAC system the y-axis of the HVAC system is aligned with the longitudinal axis of the vehicle and the x-axis of the HVAC system is aligned with the transverse axis of the vehicle. If the HVAC system is positioned between the module carrier or cross rail of the cockpit and the surface of the instrument panel, the y-axis of the HVAC system is aligned with the transverse axis of the vehicle and the z-axis of the HVAC system is aligned with the longitudinal axis of the vehicle. If the HVAC system is positioned above the floor pan of the passenger compartment, the x-axis of the HVAC system is aligned with the transverse axis of the vehicle and the y-axis of the HVAC system is aligned with the longitudinal axis of the vehicle.

The air conditioning devices placed in the casing of the HVAC system are not only inclined each relative to at least one axis of the casing, but may also have other orientations. In general, the evaporator is placed upstream of the heating heat exchanger while the fan of the HVAC system can be placed upstream or downstream of the evaporator. This makes the advantage of the present invention particularly clear. Depending on the vehicle type and the construction of the casing, the individual air conditioning devices of the HVAC system can have different arrangements within the casing to make them easier to connect to existing lines within the vehicle.

The inclined arrangement of the air conditioning devices of the HVAC system causes a curved path, for example, an S-shaped air flow path. In order to ensure the incidence of the air to be conditioned is orthogonal to the passage areas of the heating heat exchanger and the evaporator, air guiding and air distribution devices upstream of the heating heat exchanger and the evaporator are provided. The orthogonal incidence of the air to the passage areas is particularly important in order to avoid undesired temperature layering downstream of the heating heat exchanger or the evaporator.

Compared to the state-of-the-art the some advantages and features of the invention are: a flat, compact design of the casing of the HVAC system due to the inclined arrangement of the air conditioning devices; the air conditioning devices can be inclined relative to three axes of the casing; and different arrangements of the air conditioning devices are achievable due to the flat design.

Further features and advantages of this invention will become readily apparent to persons skilled in the art after a review of the following detailed description, with reference to the drawings and claims that are appended to and from a part of this specification.

BRIEF DESCRIPTION OF THE DRAWINGS

FIGS. 12a-c are respectively a side view of an HVAC system, an end view of a heating heat exchanger and an end view of an evaporator, illustrating the heating heat exchanger and the evaporator being inclined relative to the Y and X-axes.

DETAILED DESCRIPTION OF THE INVENTION

Figure 1:
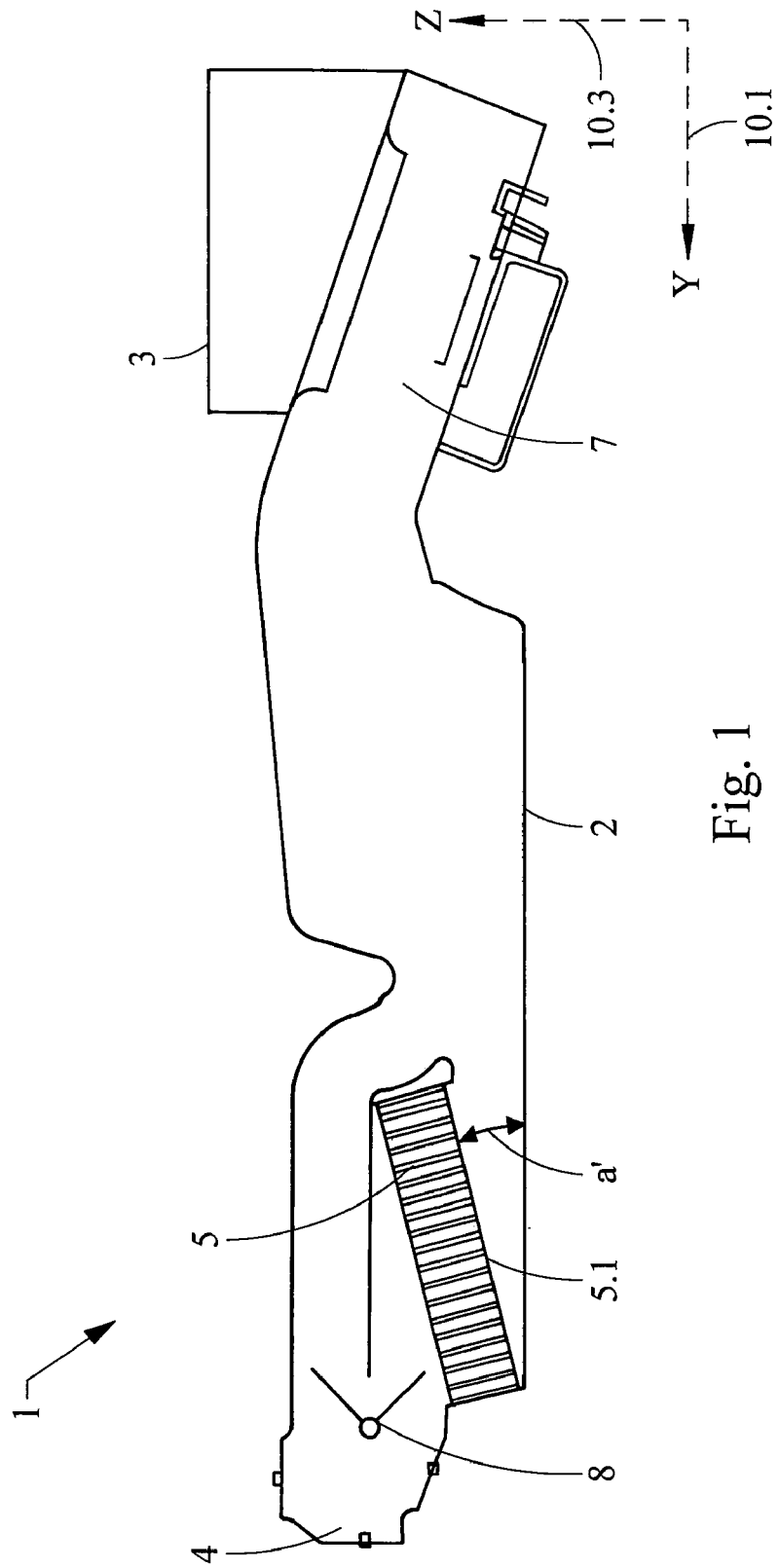
FIG. 1 is a side sectional view of a heating, ventilation, and air conditioning (HVAC) system according to the invention.

FIG. 1 illustrates a side section view of a heating, ventilation, and air conditioning (HVAC) system 1 according to the present invention for use in a motor vehicle. The HVAC system 1 includes a box-shaped casing 2, whereby a y-axis 10.1 is aligned with the longitudinal extension of the casing 2 and a z-axis 10.3 is aligned with the height of the casing 2. On the right side of FIG. 1, air is drawn in through an air inlet 3 by a fan 7 and blown out after conditioning at an air outlet 4 and fed to the vehicle's air distribution system (not shown). The HVAC system 1 includes, a heating heat exchanger 5 as well as several air guiding and air distribution devices 8 downstream of the heating heat exchanger 5 in the direction of flow of the air. The heating heat exchanger 5, in the example shown, is inclined relative to the y-axis 10.1 of the casing 2 so that the face of the passage area 5.1 of the heating heat exchanger 5 and the base area, shown as an edge only, of the casing 2 of the HVAC system 1 produce an angle a'.

Figure 2:
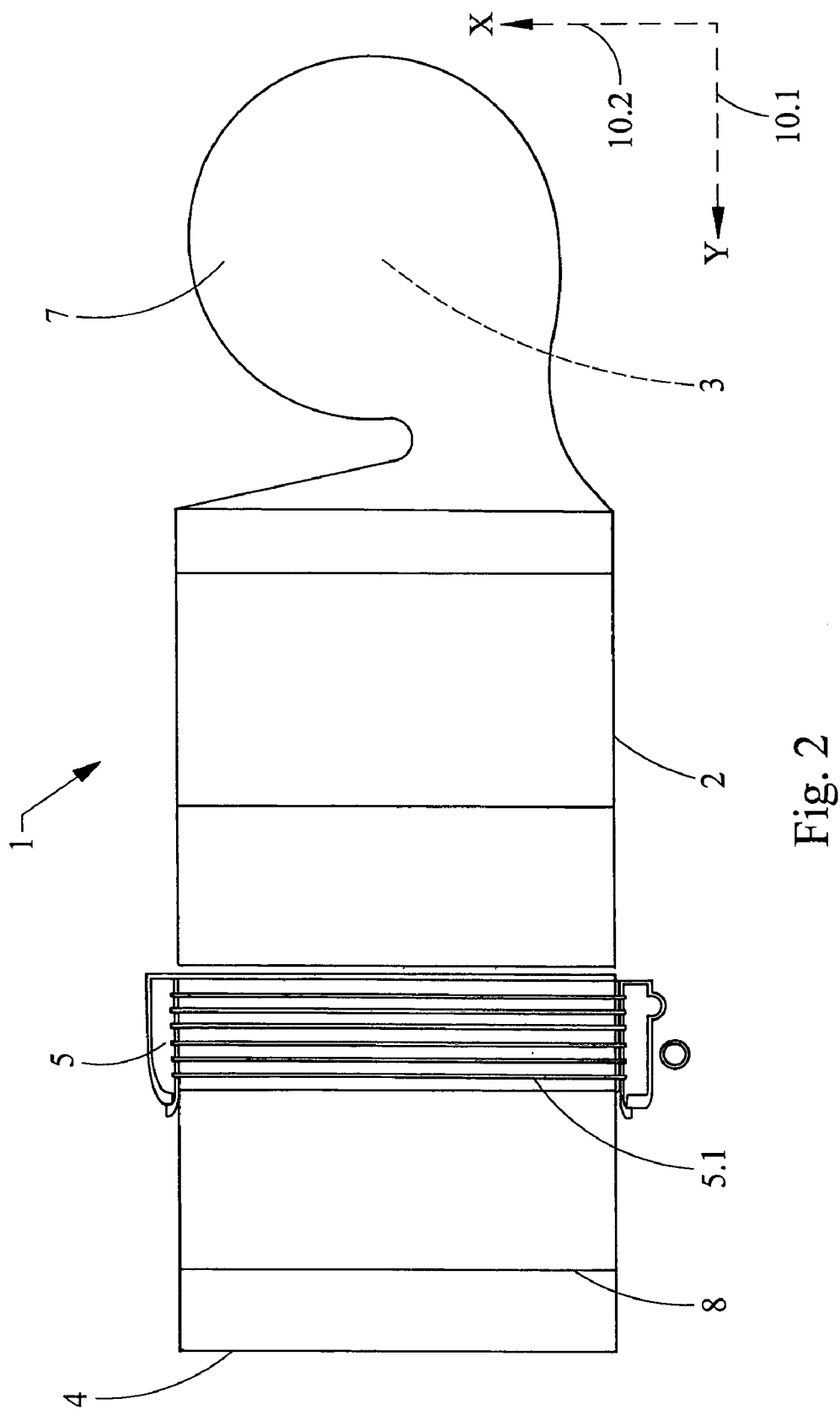
FIG. 2 is a top sectional view of the HVAC system of in FIG. 1.

FIG. 2 shows a top section view of the HVAC system 1 of FIG. 1. In this representation the y-axis 10.1 is aligned with the longitudinal extension and the x-axis 10.2 is aligned with the width of the HVAC system 1. The air inlet 3, the fan 7, the heating heat exchanger 5, the air guiding and air distribution devices 8 and the air outlet 4 are arranged in line with each other. In the example shown, the heating heat exchanger 5 extends across the whole width of the casing 2 of the HVAC system 1. This has the advantage of allowing the heating heat exchanger 5 to engage the casing 2 only on its sides. The air inlet 3, indicated by a dotted line, of the HVAC system 1 is arranged upstream of the fan 7 established as a radial fan so that the air is drawn in along the Z axis 10.3 (see FIG. 1).

Figure 3:
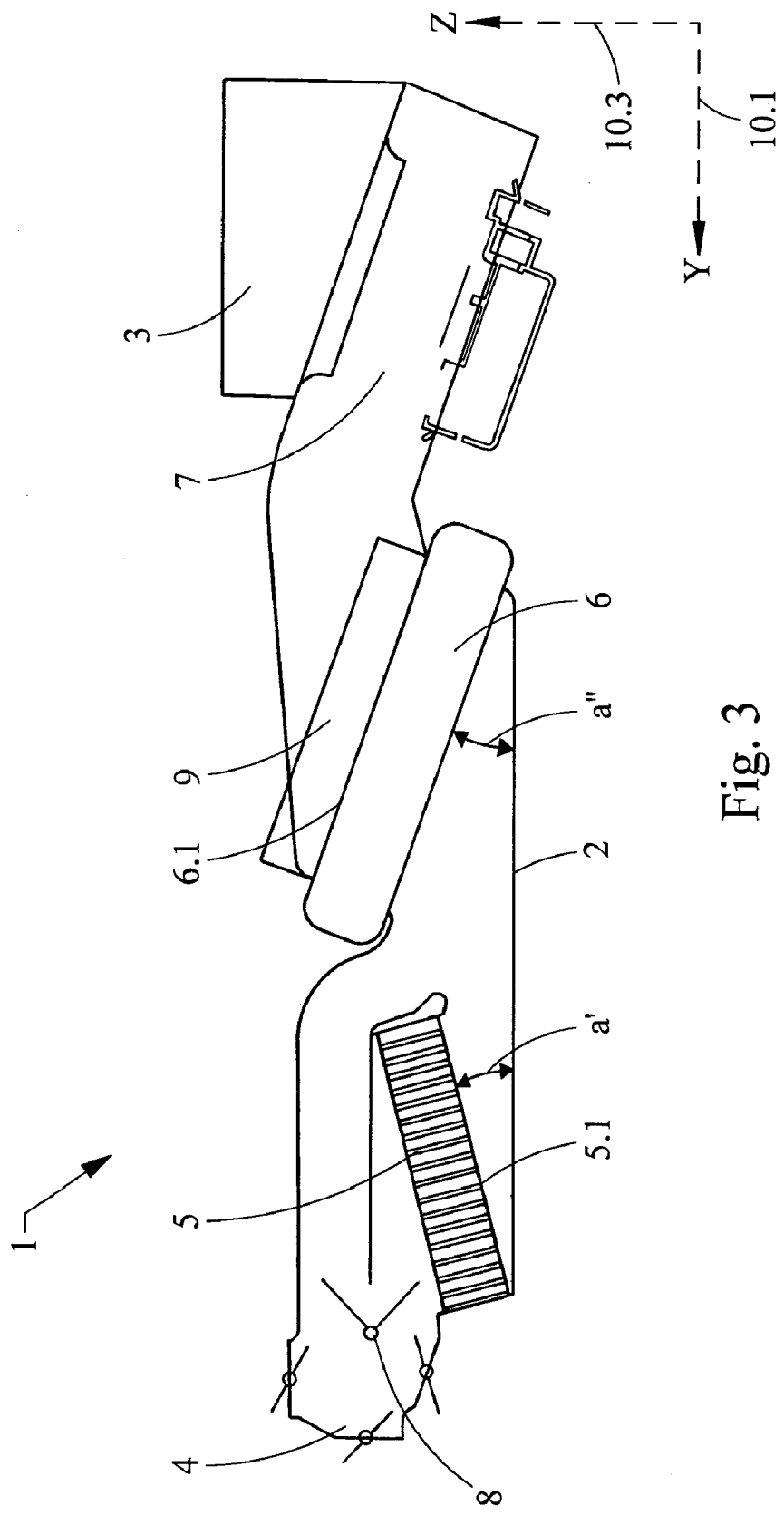
FIG. 3 is a preferred embodiment of the HVAC system showing the evaporator and the heating heat exchanger inclined relative to each other.

FIG. 3 shows an alternate arrangement of the invention with an evaporator 6 provided in addition to the heating heat exchanger 5. Upstream of the evaporator 6, there is a filter 9 aligned parallel to the passage area 6.1 of the evaporator 6 and seated directly on the evaporator 6. The fan 7 draws in air through the air inlet 3 and is located upstream of the evaporator 6. The evaporator 6 and the heating heat exchanger 5 are each inclined relative to the y-axis 10.1 of the casing 2. The heating heat exchanger 5 is inclined by the angle a' and the evaporator 6 is inclined by an angle a". The angles a' and a" may be equal or may differ.

Figure 4:
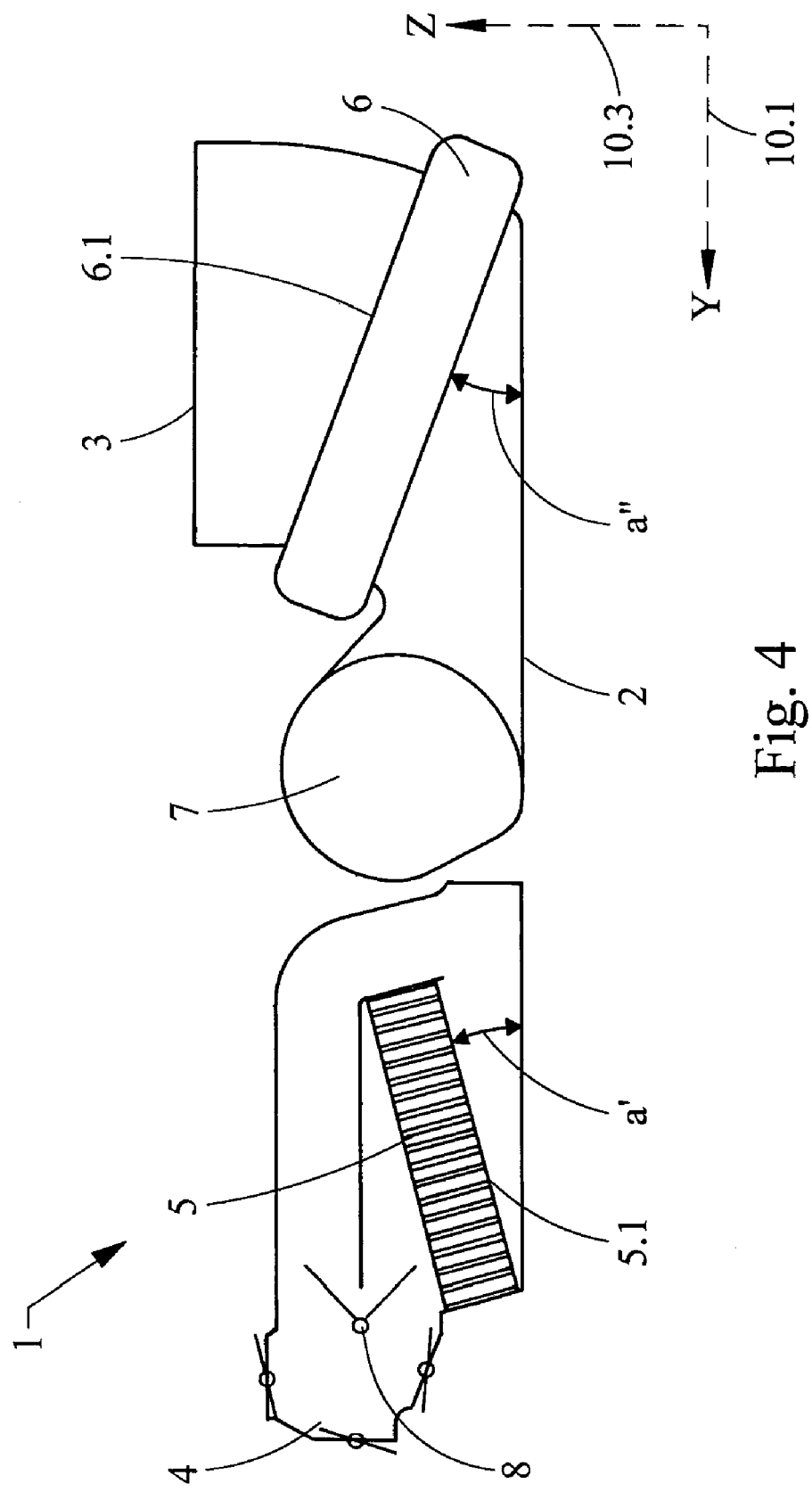
FIG. 4 is a further embodiment of the HVAC system showing the evaporator and the heating heat exchanger inclined relative to each other, and a fan being placed between the evaporator and the heating heat exchanger.

FIG. 4 illustrates a further arrangement of the air conditioning devices of the HVAC system 1. It differs from FIG. 3 in that the fan 7, established above as a radial fan, is placed between the evaporator 6 and the heating heat exchanger 5. The heating heat exchanger 5 and the evaporator 6 again are inclined by the angles a' and a", respectively, relative to the y-axis 10.1 of the casing 2.

Figure 5:
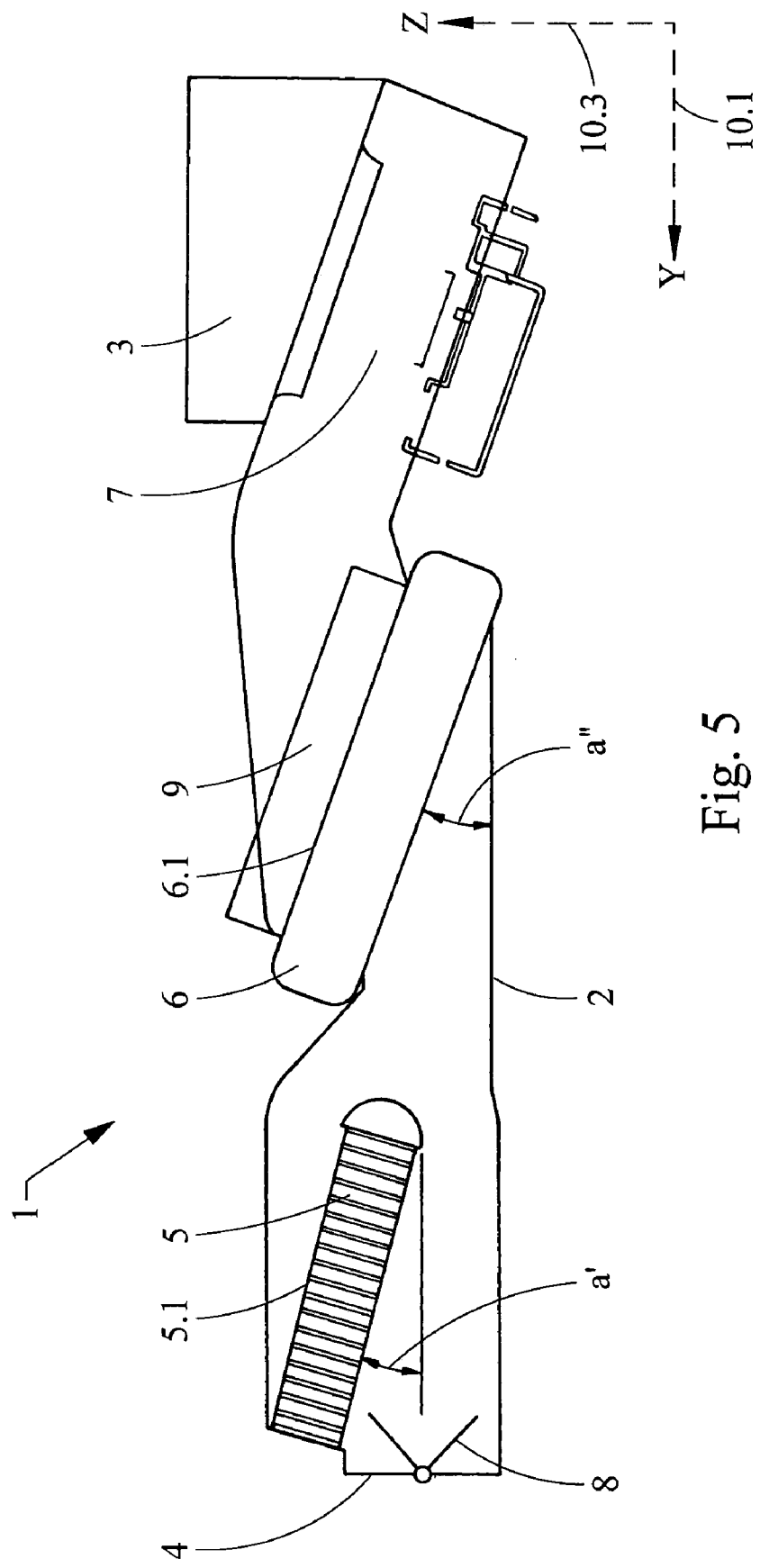
FIG. 5 is a further embodiment of the HVAC system showing the evaporator and the heating heat exchanger inclined in same direction.

The construction of the HVAC system 1 according to FIG. 5 is essentially equivalent to that of FIG. 3. The only difference is the evaporator 6 is inclined by the angle a" and the heating heat exchanger 5 is inclined by the angle a' in the same direction as the evaporator 6.

Figure 6:
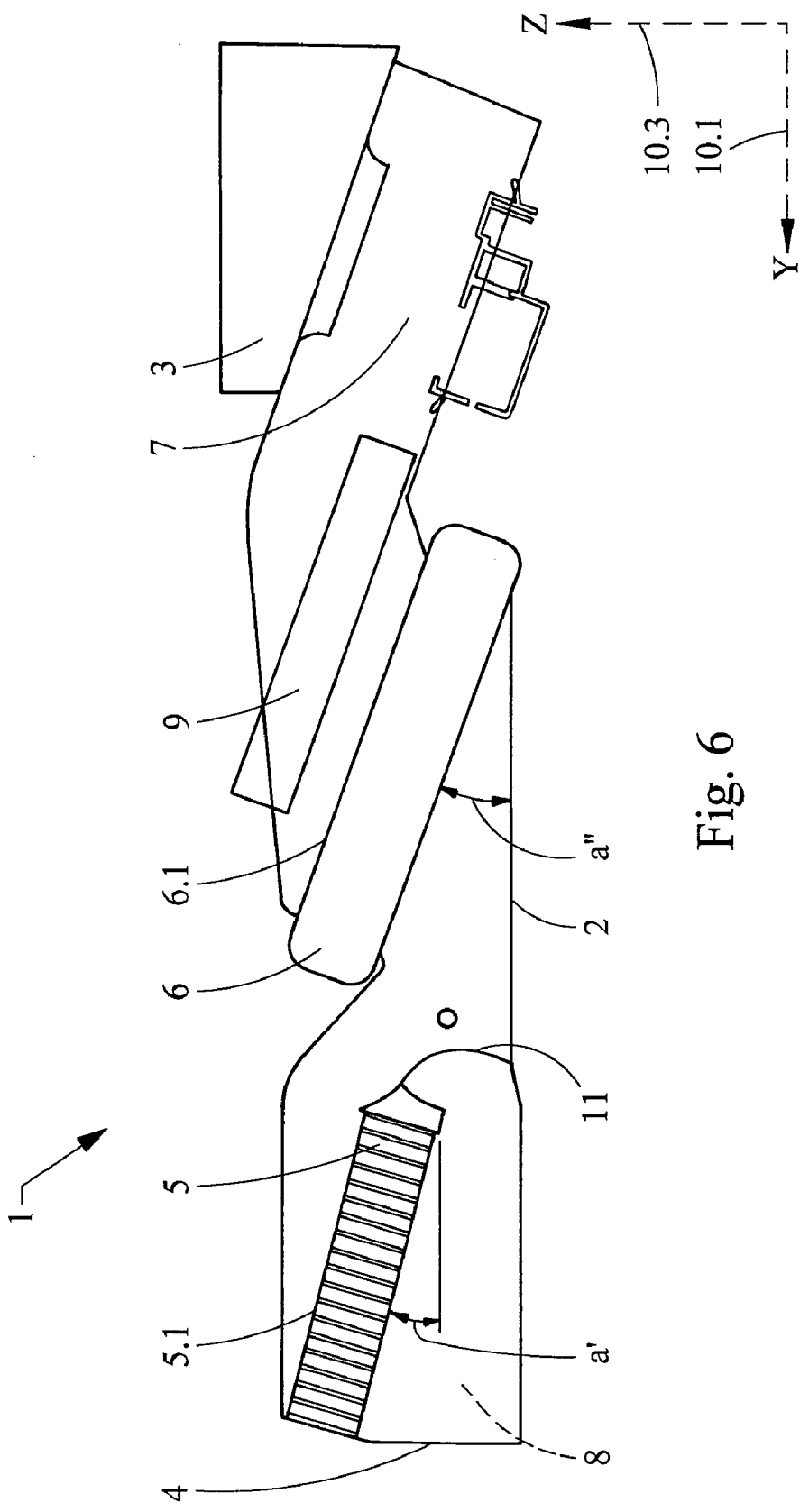
FIG. 6 is yet another embodiment of the HVAC system showing a temperature door placed between the evaporator and the heating heat exchanger, the evaporator and the heating heat exchanger being inclined in same direction.

FIG. 6 is equivalent to the arrangement of the air conditioning devices of FIG. 5. The differences with FIG. 5 are first, the filter 9 is not directly seated on the evaporator 6, but is placed parallel to and separated from the passage area 6.1 of the evaporator 6. Second, a temperature door 11 is provided directly upstream of the heating heat exchanger 5. The evaporator 6, in this case, is inclined by the angle a" and the heating heat exchanger 5 is inclined by the angle a' in same direction as the evaporator 6.

Figure 7:
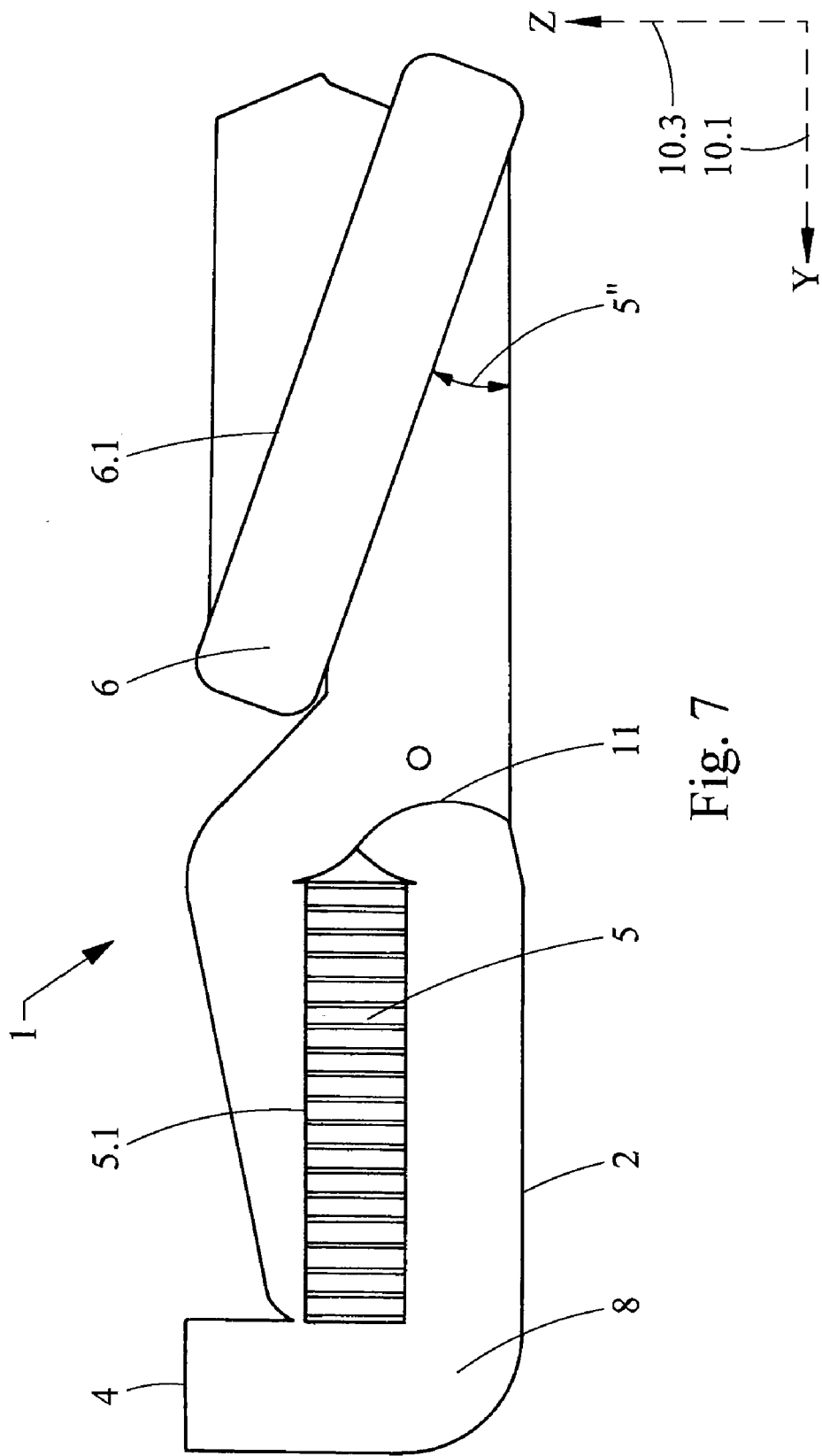
FIG. 7 is another embodiment of the HVAC system shown in FIG. 6, whereby the evaporator is inclined and the heating heat exchanger is horizontal.

FIG. 7 shows a further arrangement of the air conditioning devices in the casing 2 of the HVAC system 1 with the evaporator 6 inclined by the angle a", and the heating heat exchanger 5 positioned horizontally within the casing 2. In this embodiment a temperature door 11 is provided as in FIG. 6, directly upstream of the heating heat exchanger 5.

Figure 8:
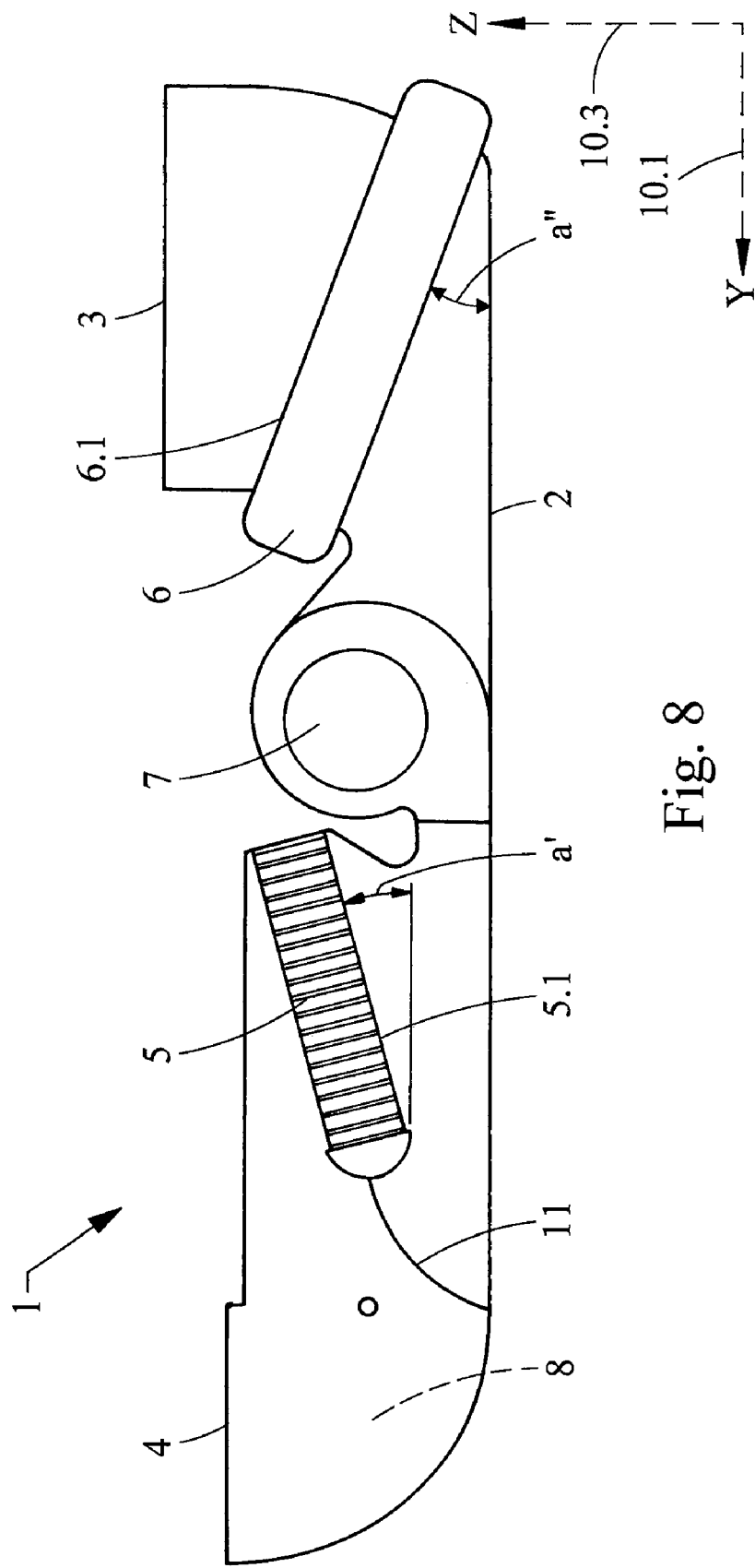
FIG. 8 is another embodiment of the HVAC system shown in FIG. 6, whereby the evaporator and the heating heat exchanger are inclined against each other, and the fan is between the evaporator and the heating heat exchanger.

FIG. 8 illustrates an arrangement of the air conditioning devices in the casing 2 of the HVAC system 1, but with a flow path of the air significantly different from the flow path of the air according to FIGS. 3 to 7. Again the fan 7 is placed between the evaporator 6 and the heating heat exchanger 5. The evaporator 6 is inclined by the angle a", the heating heat exchanger 5 is arranged inclined by the angle a' in the opposite direction of the evaporator 6.

Figure 9:
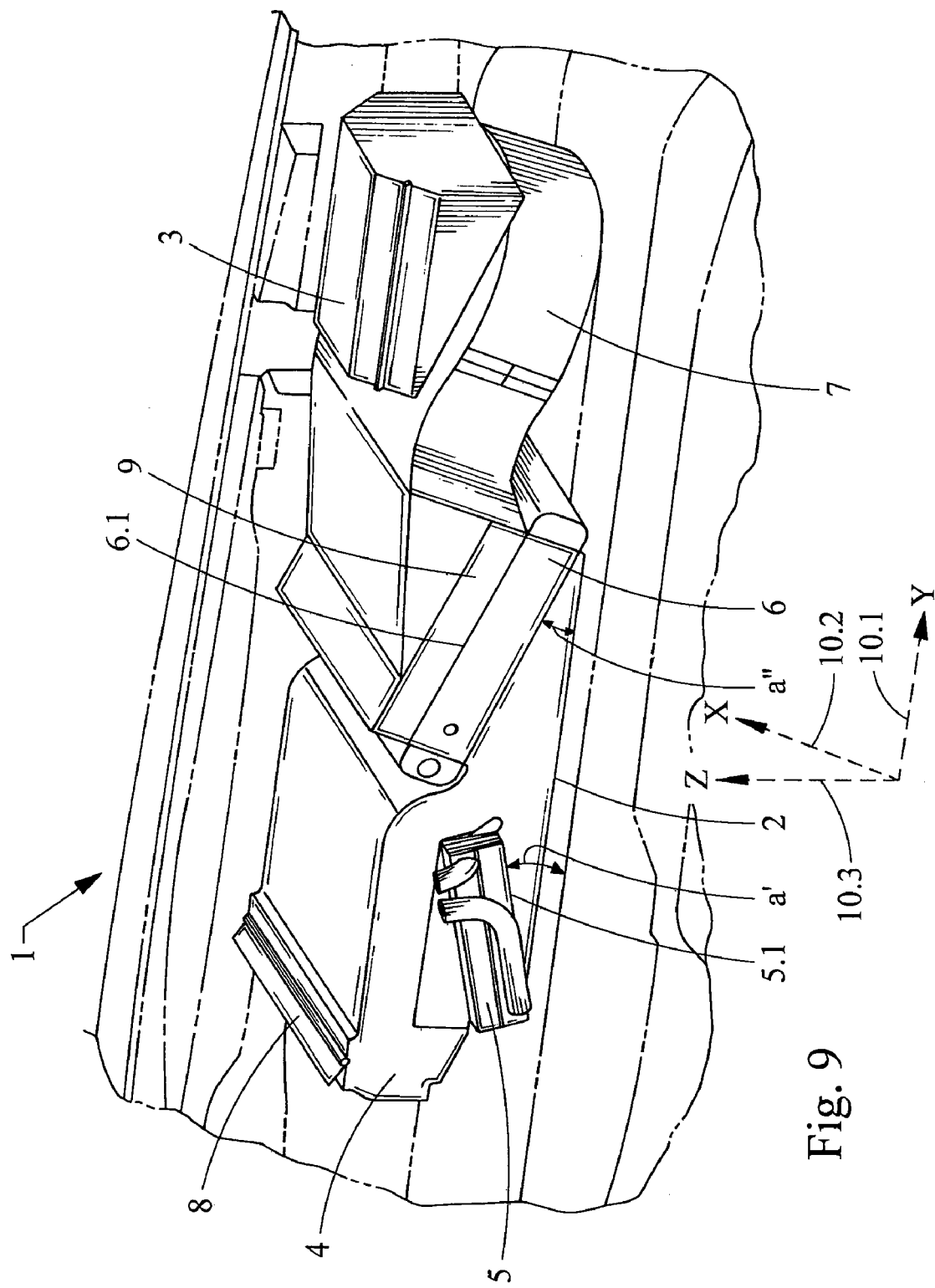
FIG. 9 is a side isometric view of the HVAC system mounted in the module carrier.
Figure 10:
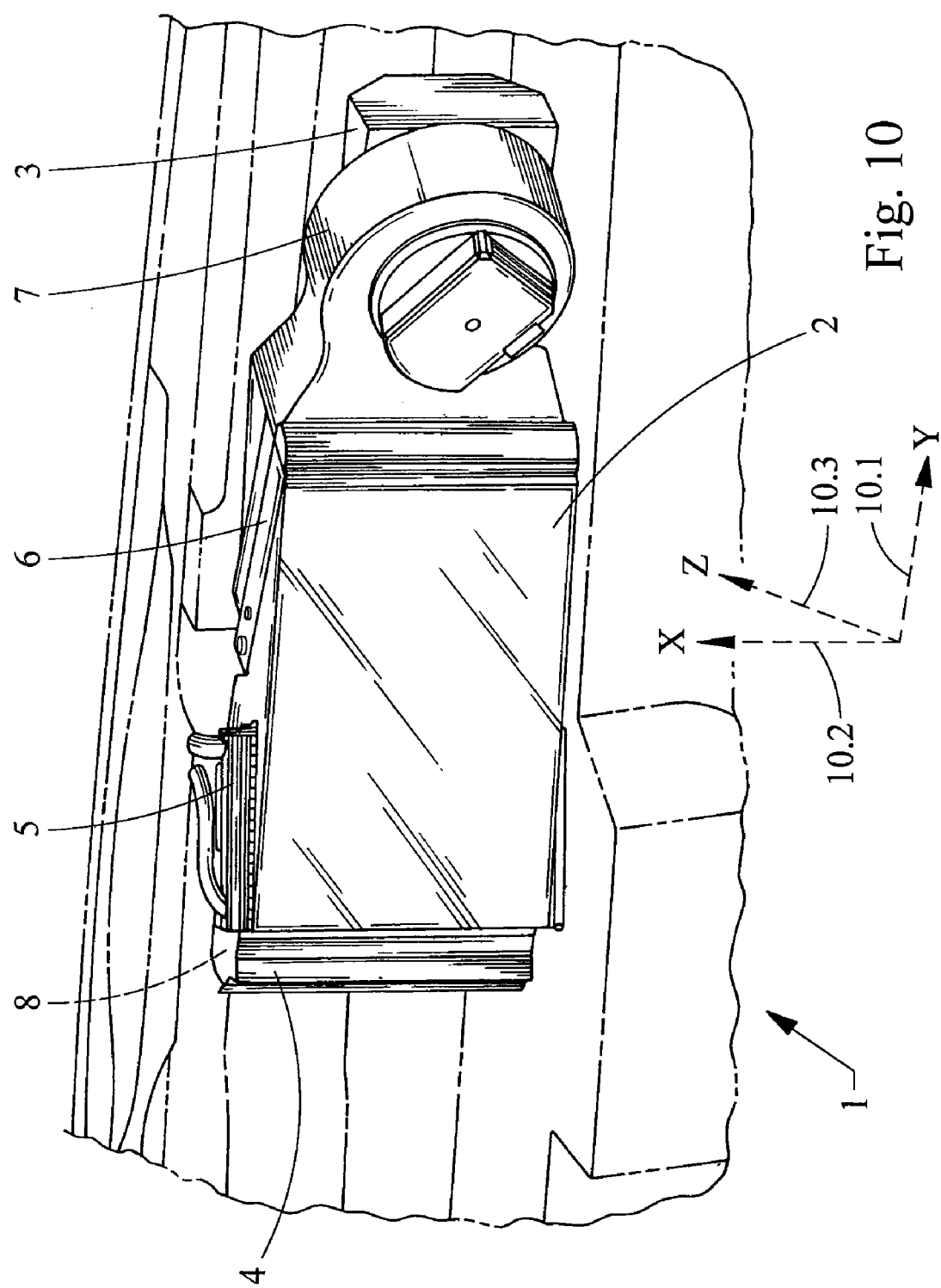
FIG. 10 is a bottom isometric view of the HVAC system in the module carrier.

FIGS. 9 and 10 each show an HVAC system 1 according to the present invention placed between the module carrier, or the cross rail, respectively, of the cockpit and the surface of the instrument panel in the vehicle. In FIG. 9 the y-axis 10.1 of the HVAC system 1 is aligned with a transverse axis of the vehicle and the z-axis 10.3 of the HVAC system 1 is aligned with a longitudinal axis of the vehicle.

Figure 11:
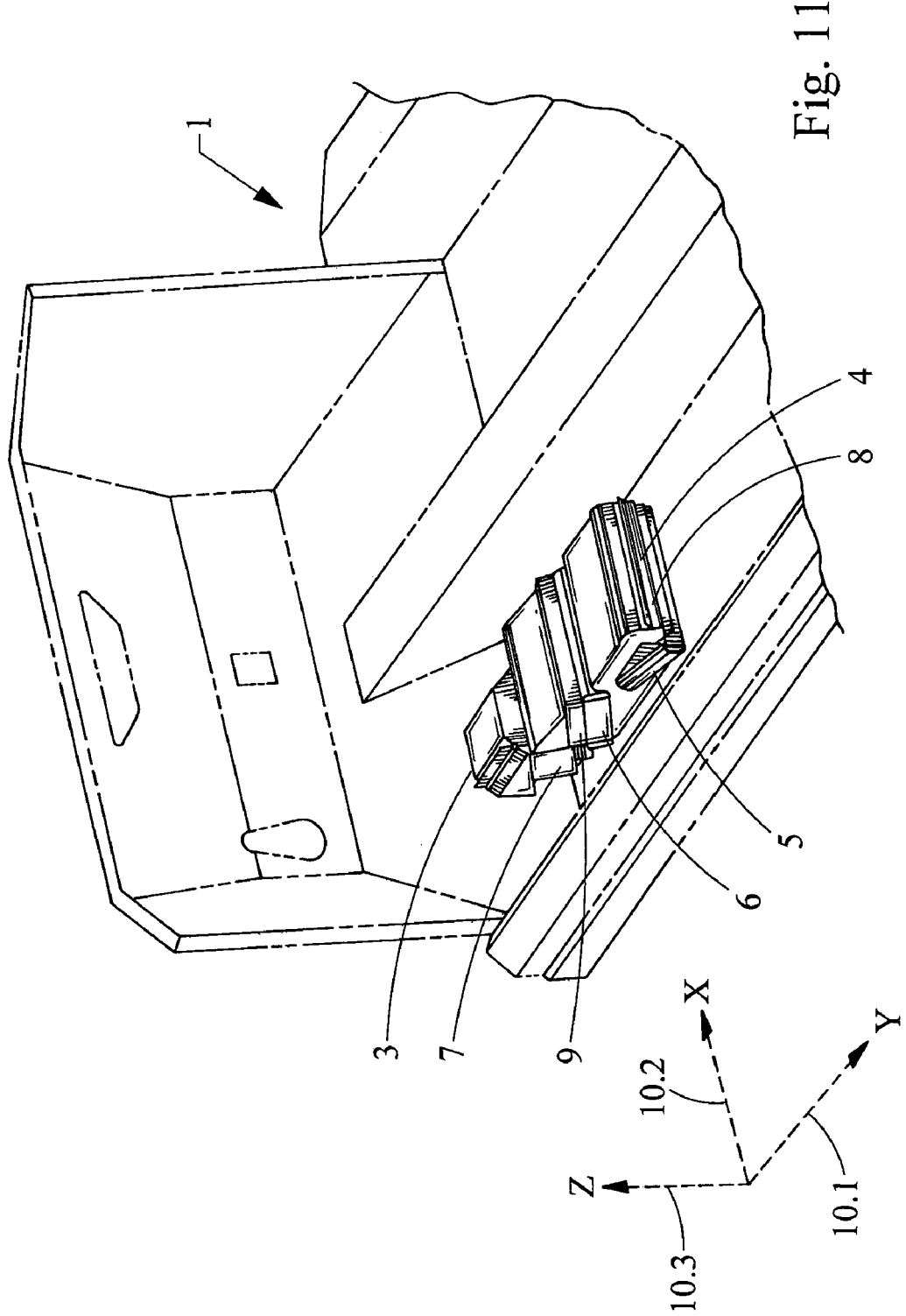
FIG. 11 is a top isometric view of the HVAC system mounted above the floor pan.

FIG. 11 illustrates a HVAC system 1 placed on the driver's side above the floor pan of the passenger compartment. The x-axis 10.2 of the HVAC system 1 is aligned with the transverse axis of the vehicle and the y-axis 10.1 of the HVAC system 1 is aligned with the longitudinal axis of the vehicle.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An HVAC system including a modular single or multiple-zone air conditioning unit having a flat design for use in motor vehicles comprising:

a box-shaped casing with a length y, a height z and a width x, and a plurality of air conditioning devices including at least one heat exchanger and a fan, and a plurality of air guiding and distribution devices being located between an air inlet at one end of the casing and an air outlet at an opposing end of the casing;

the plurality of air conditioning devices being arranged between the air inlet and the air outlet one after the other along the length y of the casing, the heat exchanger being inclined relative to the length y of the casing by an angle a' such that y>x>z.

2. An HVAC system according to claim 1 wherein the heat exchanger is inclined such that the angle a' is in the range of $0°<a'\leq 90°$ and y>x>z.

3. An HVAC system according to claim 1 wherein the air conditioning devices include an evaporator, the evaporator being inclined to the length y of the casing by an angle a" such that y>x>z.

4. An HVAC system according to claim 3 wherein the evaporator is inclined at an angle a" in the range of $0°<a''\leq 90°$ and y>x>z.

5. An HVAC system according to claim 3 wherein the heat exchanger is inclined at an angle a' in the range of $45°<a'\leq 90°$ and the evaporator is inclined at an angle a" in the range of $45°<a''\leq 90°$ to the length y.

6. An HVAC system according to claim 5 wherein the angle of inclination a' of the heat exchanger and the angle of inclination a" of the evaporator are equal.

7. An HVAC system according to claim 1 wherein the length y of the HVAC system is aligned with a longitudinal axis of the vehicle and the width x of the HVAC system is aligned with a transverse axis of the vehicle.

8. An HVAC system according to claims 1 wherein the length y of the HVAC system is aligned with a transverse axis of the vehicle and the height z of the HVAC system is aligned with a longitudinal axis of the vehicle.

9. An HVAC system according to claim 1 wherein the length y of the HVAC system is aligned with a transverse axis of the vehicle and the width x of the HVAC system is aligned with a longitudinal axis of the vehicle.

10. An HVAC system according to claim 3 wherein the fan is arranged between the heat exchanger and the evaporator.

11. An HVAC system according to claim 3 wherein a shape of the casing, in cooperation with the air guiding and air distribution devices located upstream or downstream of the heat exchanger, and the air guiding and air distribution devices located upstream or downstream of the evaporator, are configured to provide air at an orthogonal incidence to passage areas of the heat exchanger and the evaporator.

12. An HVAC system according to claim 1 wherein the heat exchanger is inclined relative to the width x of the casing by an angle b' such that y>x>z.

13. An HVAC system according to claim 3 wherein the evaporator is inclined relative to the width x of the casing by an angle b" such that y>x>z.

\* \* \* \* \*